J. SORENSEN.
AGITATOR FOR DRIERS.
APPLICATION FILED AUG. 28, 1916.
1,222,691.
Patented Apr. 17, 1917.
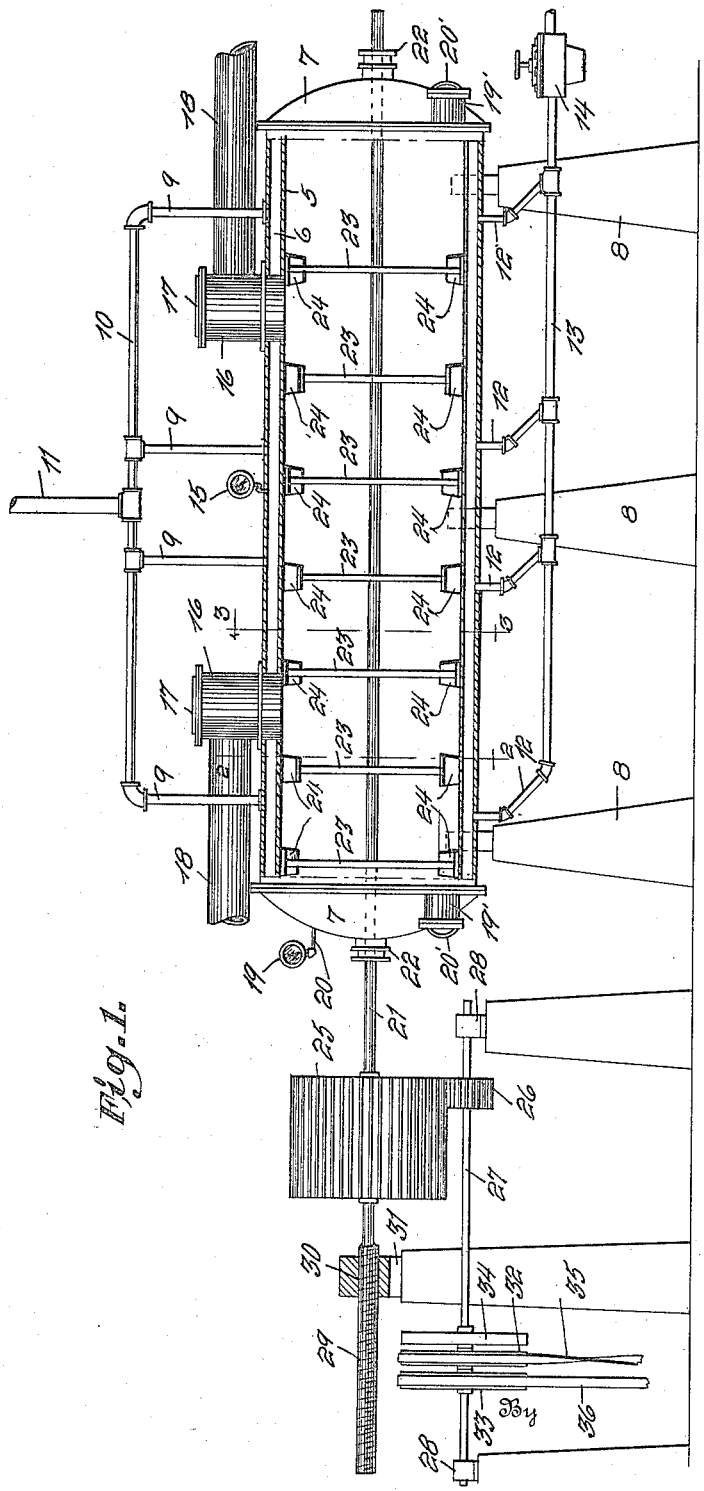
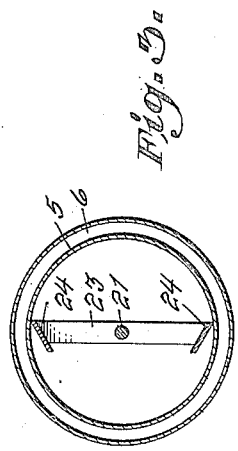
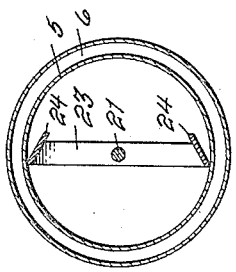
Inventor
J. Sorensen
By C. L. Parker
Attorney

UNITED STATES PATENT OFFICE.

JOHN SORENSEN, OF BROOKLYN, NEW YORK.

AGITATOR FOR DRIERS.

1,222,691.  Specification of Letters Patent.  Patented Apr. 17, 1917.

Application filed August 28, 1916. Serial No. 117,328.

*To all whom it may concern:*

Be it known that I, JOHN SORENSEN, a citizen of the United States, residing at Brooklyn, in the county of Kings and State of New York, have invented certain new and useful Improvements in Agitators for Driers, of which the following is a specification.

My invention relates to improvements in driers, preferably operating under vacuum, for evaporating normally more or less liquid dye stuffs or the like, for removing the solid constituents thereof, while the invention is in no sense restricted to this particular use.

An important object of the invention is to provide apparatus of the above mentioned character, having a highly efficient form of agitating mechanism, which retains the contents of the heating receptacle in a constant state of agitation, positively preventing the same from adhering to the walls of the heating receptacle and becoming burned.

Other objects and advantages of the invention will be apparent during the course of the following description.

In the accompanying drawings forming a part of this specification and in which like numerals are employed to designate like parts throughout the same, Figure 1 is a side elevation of apparatus embodying the invention, parts being shown in section, Fig. 2 is a transverse sectional view taken on line 2—2 of Fig. 1, and Fig. 3 is a similar view taken on line 3—3 of Fig. 1.

In the drawings, wherein for the purpose of illustration is shown a preferred embodiment of my invention, the numeral 5 designates a closed preferably horizontal shell or casing, surrounded by a steam jacket 6, having ends 7, as shown. The shell 5 and its steam jacket 6 are suitably connected and are supported by uprights 8 as shown.

Steam is fed into the upper portion of the steam jacket 6 through pipes 9, having connection with a pipe 10. The pipe 10 is connected with a common steam supply pipe 11. The steam which is condensed within the steam jacket passes from the lower portion thereof through drain pipes 12, having connection with a common drain pipe 13. The pipe 13 has a trap connected therein, as shown. The steam jacket 6 is preferably equipped with a steam pressure gage 15, as shown.

The numeral 16 designates domes, passing through the steam jacket 6 and the steam space, but having no communication therewith, and having free communication with the interior of the shell 5. The upper ends of these domes 16 are closed by lids or covers 17, connected therewith by any suitable means, such as having screw-threaded engagement therewith. The lids 17 have an air-tight union with the domes. Connected with each dome 16 is a vapor draw-off pipe 18, which may be connected with a vacuum pump, for maintaining a suitable degree of vacuum within the shell 5, and to withdraw the vapors, as the material is evaporated. The numeral 19 designates a vacuum gage having a pipe 20, which leads into the interior of the shell 5, thus indicating the degree of vacuum maintained therein. Leading into the lower portion of the shell 5 are outlet tubes 19' or conduits, for the removal of the treated material, which are provided with detachable lids 20' or the like, having an air tight connection therewith.

Extending longitudinally through the shell 5 is a substantially horizontal agitator shaft 21, passing through stuffing-boxes 22, carried by the ends 7. Rigidly mounted upon the shaft 21 are arms 23, which carry preferably alternate sets of blades or agitators 24. As clearly shown in Figs. 2 and 3, the alternate sets of blades 24 are inclined or faced in opposite directions, so that one set of these blades function when the shaft 21 is rotating in one direction, and the other set function when the direction of rotation of the shaft is reversed. The blades 24 travel adjacent or in close proximity to the inner surface of the shell 5, serving to cut the dry material from this inner surface, besides maintaining the material in a constant state of agitation.

The shaft 21 extends outwardly beyond one stiffening box 22 for a substantial distance and has a long gear 25 rigidly mounted thereon. This long gear engages a smaller gear 26, and remains in permanent engagement therewith, during the longitudinal travel of the shaft 21, as will be apparent. The gear 26 is rigidly mounted upon a shaft 27 which is journaled through stationary bearings 28. The means for rotating the shaft 27 in opposite directions, will be described hereinafter.

The shaft 21 has its end portion screw-threaded, as shown at 29, and this screw-threaded portion operates within an internally screw-threaded sleeve 30, which is attached to a block 31 and held stationary thereby. It is apparent that the rotation of the gear 25 will rotate the shaft 21, which by virtue of its screw-threaded portion 29 and sleeve 30 will move longitudinally.

The numeral 32 designates a pulley which is rigidly mounted upon the shaft 27 and pulleys 33 and 34 are idle thereon. The numeral 35 designates a crossed belt, while the numeral 36 designates a straight or uncrossed belt, these belts preferably receiving their movement from a common pulley, driven by any suitable means. Any suitable belt shifting mechanism may be employed to shift the belt 35 from the pulley 32 onto the pulley 34 and to shift the belt 36 from the pulley 33 onto the pulley 32. When the belt 35 engages the pulley 32, this pulley will be driven in one direction, but when the belt 36 engages the pulley 32 this pulley will be driven in an opposite direction. The belt shaft mechanism employed is preferably automatic, and is timed in its operation, to shift the belts, when the gear 25 has traveled longitudinally in either direction for the extent of its travel, as illustrated in Fig. 1.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, what I claim is:—

1. In apparatus of the character described, a substantially closed shell, sets of relatively short blades arranged within the shell in close proximity to the interior surface thereof to scrape hard material from the interior surface, the blades in one set being oppositely faced with respect to the blades in the other set, and means to alternately rotate all of the blades in opposite directions.

2. In apparatus of the character described; a substantially closed shell; sets of relatively short blades arranged within the shell in close proximity to the inner surface thereof to scrape hard material from such inner surface, such sets being longitudinally spaced with relation to the shell, the blades in one set being oppositely faced with relation to the blades in the other set; means to simultaneously reciprocate all of the blades longitudinally within the shell; and means to alternately simultaneously rotate all of the blades in opposite directions.

In testimony whereof I affix my signature in presence of two witnesses.

JOHN SORENSEN.

Witnesses:
HENRY FISHER,
CHARLES SORENSEN.

Copies of this patent may be obtained for five cents each, by addressing the "Commissioner of Patents, Washington, D. C."